July 3, 1934. J. P. GRIFFIN ET AL 1,965,313
BABY VEHICLE
Filed April 17, 1933 2 Sheets-Sheet 1

Inventor
J. Philip Griffin
W. B. Anderson
By Clarence A. O'Brien
Attorney

July 3, 1934.  J. P. GRIFFIN ET AL  1,965,313
BABY VEHICLE
Filed April 17, 1933   2 Sheets-Sheet 2
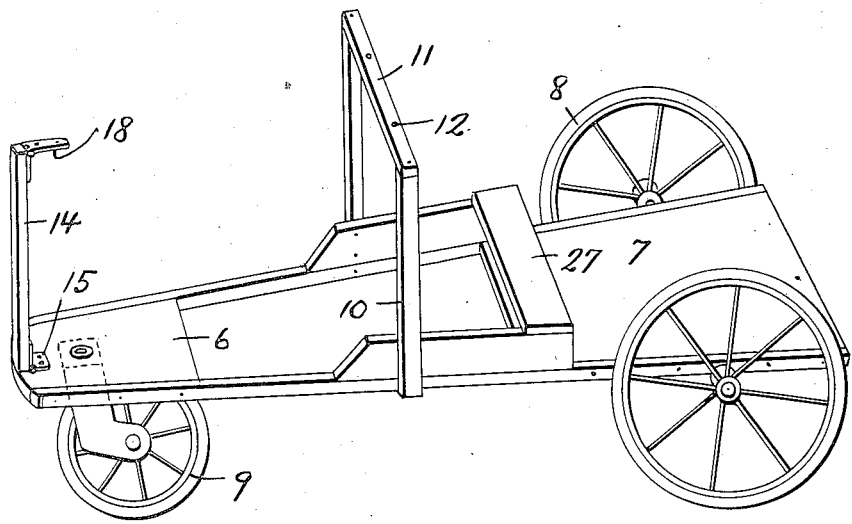
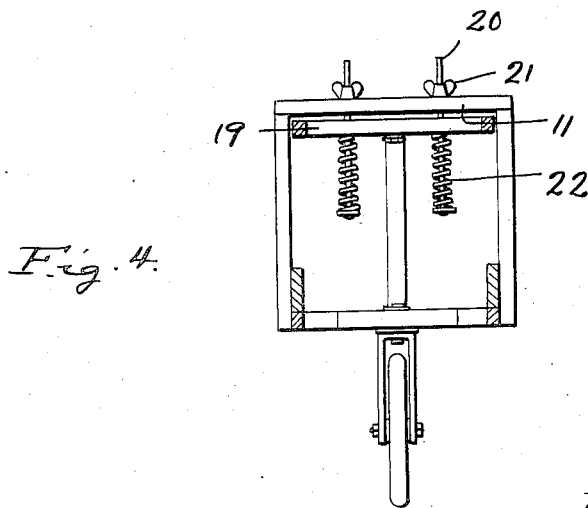
Inventor
J. Philip Griffin
W. B. Anderson
By Clarence A. O'Brien
Attorney Patented July 3, 1934

1,965,313

UNITED STATES PATENT OFFICE 1,965,313

BABY VEHICLE

Jesse P. Griffin and Washington B. Anderson, Live Oak, Fla.

Application April 17, 1933, Serial No. 666,574

1 Claim. (Cl. 155—18)

The present invention relates to a contrivance designed for use by mothers in taking care of infants from about four months to two years old.

The object of the invention resides in the provision of a contrivance of this nature in the form of a vehicle on which the infant may be seated and will be amused and the vehicle is capable of being easily moved from place to place.

A further important object of the invention resides in the provision of a contrivance of this nature which is exceedingly simple in its construction, inexpensive to manufacture, strong and durable, thoroughly efficient and reliable for the purpose intended and otherwise well adapted to carry out its ends.

With the above and numerous other objects in view as will appear as the description proceeds, the invention consists in certain novel features of construction, and in the combination and arrangement of parts as will be hereinafter more fully described and claimed.

In the drawings:

Figure 3 is a perspective view of the lower frame, and

Figure 4 is a vertical transverse section taken substantially on the line 4—4 of Figure 1.

Figures 1, 2:
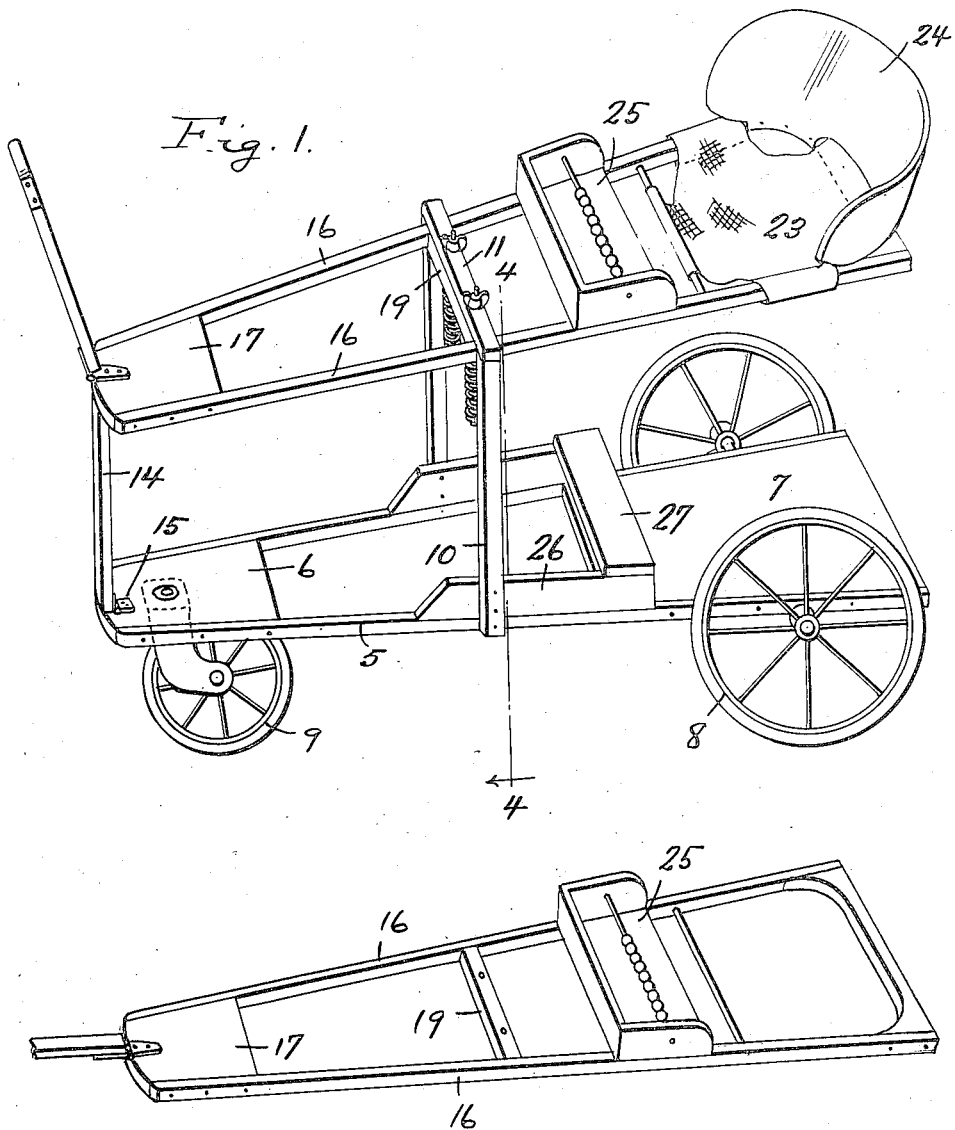
Figure 1 is a perspective view of the contrivance embodying the features of my invention.
Figure 2 is a perspective view of the upper frame.

Referring to the drawings in detail it will be seen that a lower frame comprises a pair of side bars 5 which diverge rearwardly from each other and are connected at their front end portions by a cross plate 6 and at their rear end portions by a cross plate 7. A wheeled truck 8 is mounted under and across the rear end portions of the bars 5 and the plate 7. A caster truck 9 is mounted under the plate 6. Bars 10 rise from intermediate portions of the bars 5 and have a cross bar 11 on the upper end thereof provided with a pair of openings 12. A post 14 is hingedly connected as at 15 with the plate 6 at the front end thereof. An upper frame comprises a pair of side bars 16 which diverge rearwardly from each other. The front ends of the bars 16 are connected by a cross plate 17 to which the upper end of the post 14 is hingedly connected as at 18. A cross bar 19 is mounted between intermediate portions of the bars 16 and has openings through which project bolts 20. The bolts 20 also project through the openings 12. Wing nuts 21 are engaged on the upper ends of the bolts 20. Springs 22 are disposed about the bolts and impinge upwardly against the bar 19. A canvas sheet 23 is mounted between the rear end portions of the bars 16 and has a back 24 associated therewith. A box 25 is mounted across the bars 16 between the bar 19 and the sheet 23 and is adapted to hold amusement devices for the baby.

Brace bits 26 are mounted on the bars 5 and connected to the bars 10 and support a foot rest 27 across the rear portion thereof.

It will readily be appreciated that the infant is placed on the sheet 23 and the upper frame is resiliently mounted to swing up and down with very little attention on the part of the mother. The infant is provided with suitable amusement devices in the box 25 and therefore should require but little attention. The entire contrivance may be moved easily from room to room. When desired the contrivance may be knocked down readily for storage and transportation purposes.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

In a baby vehicle, a base frame, wheels supporting the rear end of the base frame, a swivel wheel supporting the front end of the base frame, a standard hinged at its lower end to the front end of the base frame whereby to swing from a horizontal position upwardly therefrom, an upper frame hinged at its forward end to the free end of the standard, side bars rising vertically from the base frame at opposite sides of the last named frame, a cross bar connecting the upper ends of said side bars, said upper frame extending between said side bars, spring devices connecting the upper frame with said cross bar normally urging said upper frame upwardly and against the under side of said cross bar, a seat on the rear end of the upper frame and a back for the seat rising from said upper frame, and a foot rest extending transversely of the base frame rearwardly with respect to said side bars.

JESSE P. GRIFFIN.
WASHINGTON B. ANDERSON.